United States Patent
Iorio et al.

(10) Patent No.: US 10,056,934 B2
(45) Date of Patent: Aug. 21, 2018

(54) DYNAMICALLY CONFIGURABLE ANTENNAS

(71) Applicant: AUTODESK, INC., San Rafael, CA (US)

(72) Inventors: Francesco Iorio, Toronto (CA); Michael Tao, Toronto (CA); John Yee, Toronto (CA); Alexander Tessier, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 14/591,766

(22) Filed: Jan. 7, 2015

(65) Prior Publication Data

US 2016/0197644 A1 Jul. 7, 2016

(51) Int. Cl.
| | |
|---|---|
| H04B 1/44 | (2006.01) |
| H04W 16/14 | (2009.01) |
| H04B 7/04 | (2017.01) |
| H01Q 9/14 | (2006.01) |

(52) U.S. Cl.
CPC ............... *H04B 1/44* (2013.01); *H01Q 9/14* (2013.01)

(58) Field of Classification Search
CPC ....... H04W 16/24; H01Q 1/246; H01Q 1/242; H01Q 1/243
USPC ................... 455/562.1, 575.7, 13.3, 25, 63.4
See application file for complete search history.

(56) References Cited

U.S. PATENT DOCUMENTS

| | | | | |
|---|---|---|---|---|
| 3,778,827 | A * | 12/1973 | Strenglein | G01S 13/18 342/80 |
| 5,432,411 | A * | 7/1995 | Beeteson | H01J 29/003 315/370 |
| 5,497,099 | A * | 3/1996 | Walton | B01D 46/46 324/639 |
| 9,024,839 | B2 * | 5/2015 | Schneider | 343/893 |
| 2004/0021606 | A1 * | 2/2004 | Shigihara | H01Q 9/0414 343/700 MS |
| 2005/0255312 | A1 * | 11/2005 | Fujihara | B82Y 30/00 428/323 |
| 2006/0187470 | A1 * | 8/2006 | Massey | G01B 11/002 356/614 |
| 2006/0222101 | A1 * | 10/2006 | Cetiner | H01Q 21/061 375/267 |
| 2007/0224948 | A1 * | 9/2007 | Hartenstein | H01Q 9/14 455/101 |
| 2009/0146894 | A1 * | 6/2009 | Drexler | H01Q 1/38 343/757 |
| 2009/0237255 | A1 * | 9/2009 | Rofougaran | H04L 12/40013 340/572.7 |
| 2010/0081467 | A1 * | 4/2010 | Alex | H04L 5/0023 455/509 |

(Continued)

*Primary Examiner* — Bobbak Safaipour
(74) *Attorney, Agent, or Firm* — Artegis Law Group, LLP

(57) ABSTRACT

A dynamically configurable antenna is integrated into a system configured to transmit and receive data. Antenna control software and/or hardware configures the antenna to transmit and receive data with different operating characteristics, depending on the communication needs of the system. The physical structure of the dynamically configurable antenna can be modified in order to perform data communications with specific frequency ranges, directionalities, transmission and/or amplification powers, and other operating characteristics generally associated with wireless RF communication.

25 Claims, 10 Drawing Sheets

(56) References Cited

U.S. PATENT DOCUMENTS

| | | | | |
|---|---|---|---|---|
| 2011/0298688 A1* | 12/2011 | Jalali Mazlouman | . | H01Q 1/362 343/895 |
| 2015/0200453 A1* | 7/2015 | Stambovsky | .......... | H01Q 3/247 342/374 |
| 2016/0064816 A1* | 3/2016 | Preradovic | ............... | H01Q 3/24 455/562.1 |

* cited by examiner

DYNAMICALLY CONFIGURABLE ANTENNAS

BACKGROUND OF THE INVENTION

Field of the Invention

The present invention relates generally to radio frequency (RF) communications and, more specifically, to dynamically configurable antennas.

Description of the Related Art

Conventional antennas may be found in a wide variety of devices and other types of machines, including cellular phones, tablet computers, desktop and laptop computers, televisions, WiFi™ routers, wearable computers, automobiles, airplanes, satellites, and so forth. Such devices and machines typically rely on one or more antennas to transmit and receive data using radio frequency RF signals.

When designing a conventional antenna, a designer or team of designers typically analyzes a set of tradeoffs between various design objectives and different design constraints. The design objectives for a given antenna may include requirements related to the range, spectrum, directionality, and other operating characteristics associated with the transmission and/or reception of RF signals. The design constraints for the antenna generally reflect limitations related to the size, weight, volume, surface area, power consumption, and other restrictions dictated by the specific use case of the antenna. By analyzing the design objectives in light of the design constraints, the designers attempt to select a particular antenna geometry that strikes an appropriate balance between the objectives and constraints.

One problem with the above approach is that the design constraints usually limit the selection of antenna geometries to those with narrowly defined operating characteristics, such as a narrow spectrum of operating frequencies and/or a limited directionality. Consequently, devices and machines that include conventional antennas oftentimes have narrow transmission and/or reception capabilities, resulting in acceptable performance only within a narrow scope of use cases.

As the foregoing illustrates, what is needed in the art is more effective antenna design that addresses one or more of the problems set forth above.

SUMMARY OF THE INVENTION

One embodiment of the present invention sets forth an antenna configured for a range of antenna geometries, including a first communication link configured to transport data signals and a first antenna element coupled to the first communication link and configured to receive a first control signal, and, in response to the first control signal, form a first connection between a first portion of the communication link and a second portion of the communication link to effect a first antenna geometry At least one advantage of the techniques set forth herein is that the dynamically configurable antenna is applicable to a wider range of use cases compared to conventional antennas.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
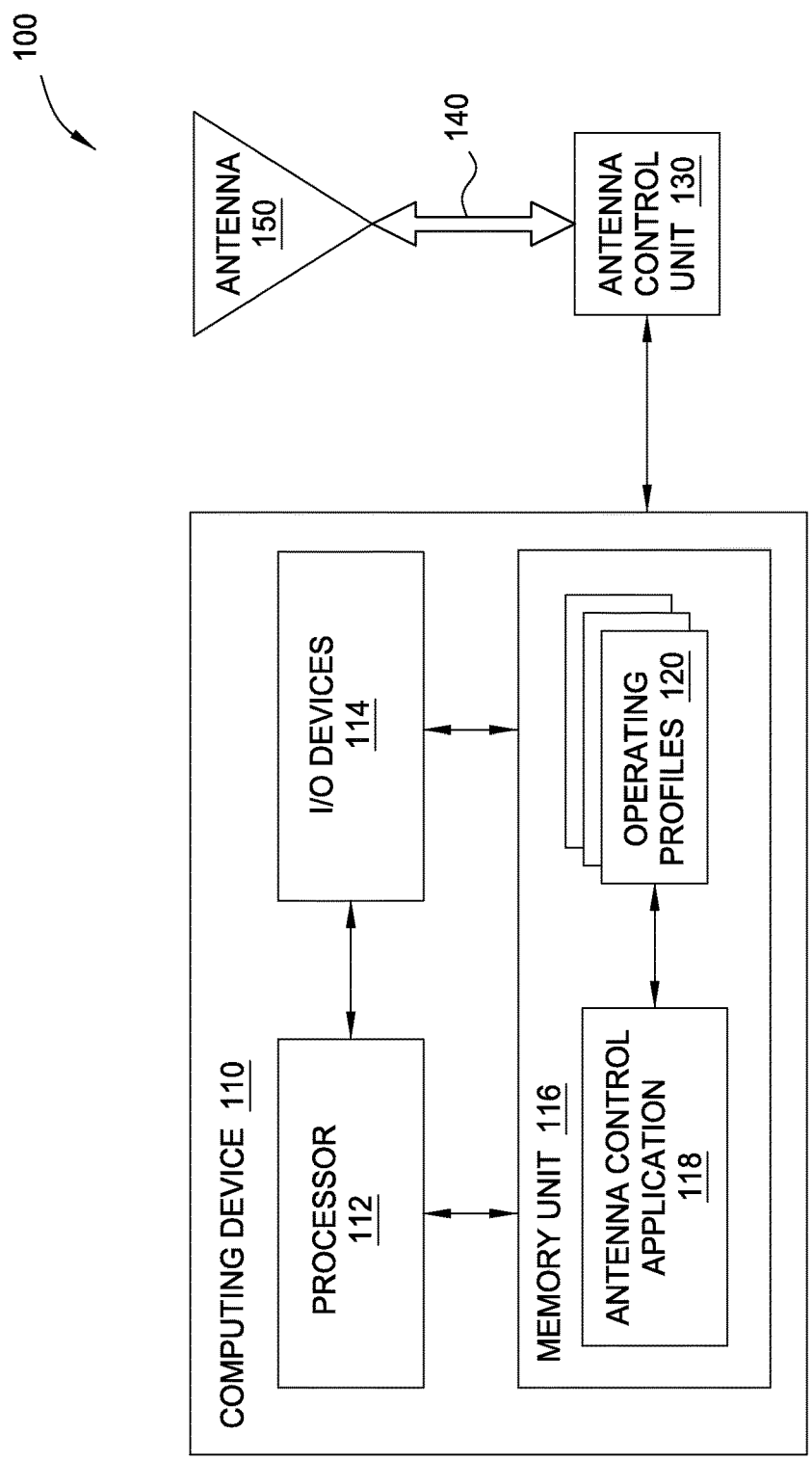
FIG. 1 illustrates a system configured to implement one or more aspects of the present invention.

FIG. 1 illustrates a system 100 configured to implement one or more aspects of the present invention. System 100 may reside within a mobile device, such as cell phone, tablet computer, and so forth, or any other type of device that performs wireless communications.

As shown, system 100 includes a computing device 110 coupled to an antenna control unit 130 that, in turn is coupled via communication link 140 to a dynamically configurable antenna 150 (referred to hereinafter as antenna 150). Antenna 150 may include communication link 140 or sublinks (not shown here) that couple to communication link 140. Computing device 110 includes a processor 112, input/output (I/O) devices 114, and memory unit 116 coupled together. Memory unit 116 includes antenna control application 118 and operating profiles 120.

Processor 112 may be any technically feasible type of hardware unit configured to process data and execute software applications. Processor 112 could be, for example, a central processing unit (CPU), a graphics processing unit (GPU), a CPU coupled to a GPU, a system-on-chip (SoC), an application-specific integrated circuit (ASIC), and so forth. I/O devices 114 may include devices configured to receive input, devices configured to provide output, and/or devices configured to both receive input and provide output. For example, I/O device could include a keyboard, mouse, display device, speaker, universal serial bus (USB) port, touchscreen, and so forth. Memory unit 116 may be any technically feasible hardware unit configured to store data and software applications. Memory unit 116 could include, for example, a hard disk, a random access memory (RAM) module, a read-only memory (ROM) unit, flash memory, or any combination thereof.

Antenna control application 118 within memory unit 116 includes program code that, when executed by processor 112, causes processor 112 to issue commands to antenna control unit 130 for performing RF communications using antenna 150. In doing so, antenna control application 118 may interact with antenna control unit 130 in order to configure antenna to operate with different operating characteristics. In the context of this disclosure, an "operating characteristic" refers to any characteristic with which antenna 150 transmits or receives data, including a frequency spectrum, amplitude, directionality, transmission power, amplification power, signal-to-noise ratio, etc. As described in greater detail below in conjunction with FIGS. 2A-6, antenna control unit 130 is capable of modifying one or more physical properties, including internal connections, associated with antenna 150 in order to alter the operating characteristics of that antenna.

Each operating profile 120 reflects a different set of operating characteristics with which antenna 150 may transmit and/or receive data. For example, a given operating profile could correspond to a particular frequency spectrum and directionality with which antenna 150 may optimally transmit and/or receive data. Antenna control application 118 is configured to select a particular operating profile 120 for configuring antenna control unit 130, and antenna control unit 130 may then affect various changes to the physical structure of antenna 150, based on the selected profile, in order to achieve the operating characteristics associated with that profile. Returning to the example mentioned above, antenna control unit 130 could configured the physical structure of antenna 150, based on the selected operating profile, to transmit and receive data with the particular frequency spectrum and directionality associated with that profile.

Antenna control application 118 may select a given operating profile 120 for configuring antenna 150 based on a wide variety of parameters. Generally, antenna control application 118 selects a given operating profile 120 based on the current communication needs of system 100. For example, when system 100 is integrated into a cell phone, antenna control application 118 could select an operating profile 120 that enables the transmission and reception of cellular signals, and then cause antenna control unit 130 to configure antenna 150 for performing wireless communications on a cellular network based on that profile. Similarly, when system 100 is integrated into a WiFi™ enabled device, antenna control application 118 could select an operating profile 120 that enables the transmission and reception of 2.4 Ghz RF signals, and then cause antenna control unit 130 to configure antenna 150 for performing wireless communications on a 2.4 Ghz WiFi™ network based on that profile. Each operating profile 120 may reflect a wide variety of different types of operating characteristics with which antenna 150 may communicate data.

Antenna control unit 130 configures antenna 150 according to the various differnet operating profiles 120 in order to effect different antenna geometries. Each of FIGS. 2A-2D, 3A-3B, 4A-4B, 5A-5B, and 6 illustrates a different implementation of antenna 150 that is configured to effect a range of different antenna geometries.

Exemplary Implementations of a Dynamically Configurable Antenna

Figure 2A:
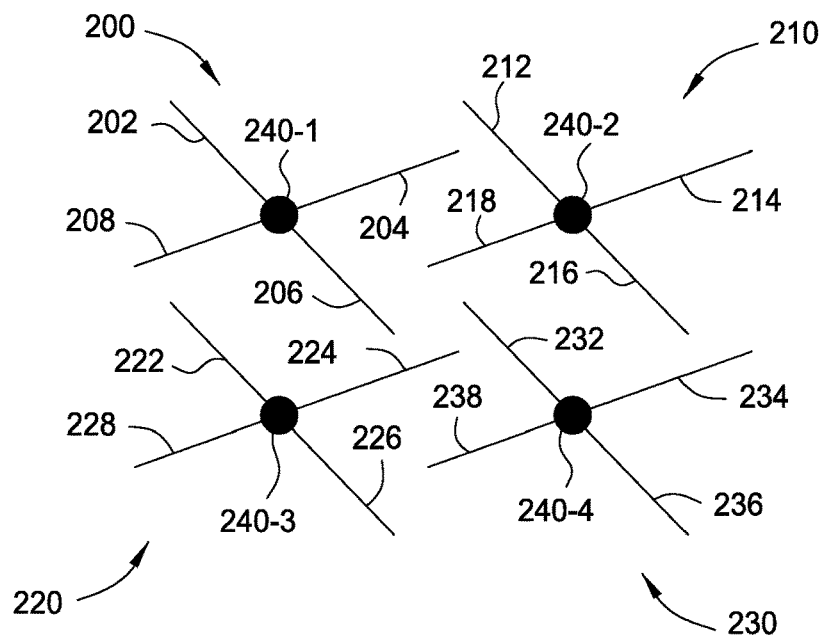
FIGS. 2A-2D illustrate an example of the dynamically configurable antenna of FIG. 1 implemented with memory alloy elements that form a two-dimensional (2D) plane, according to one embodiment of the present invention.

FIG. 2A illustrates various connector units within antenna 150 of FIG. 1 configured to form a 2D plane, according to one embodiment of the present invention. As shown, connection units 200, 210, 220, and 230 reside proximate to one another. Each connection unit includes a set of shape memory allow elements coupled to a sublink of communication link 140. Connection unit 200 includes shape memory alloy elements 202, 204, 206, and 208 coupled to sublink 240-1, connection unit 210 includes shape memory alloy elements 212, 214, 216, and 218 coupled to sublink 240-2, connection unit 220 includes shape memory alloy elements 222, 224, 226, and 228 coupled to sublink 240-3, and connection unit 230 includes shape memory alloy elements 232, 234, 236, and 238 coupled to sublink 240-4. Each sublink 240 is coupled to communication link 140 and allows RF signals to travel to and from communication link 140. Each shape memory alloy element may be a wire, a fin, a filament, or any other type of element configured to change shape.

Figure 2B:
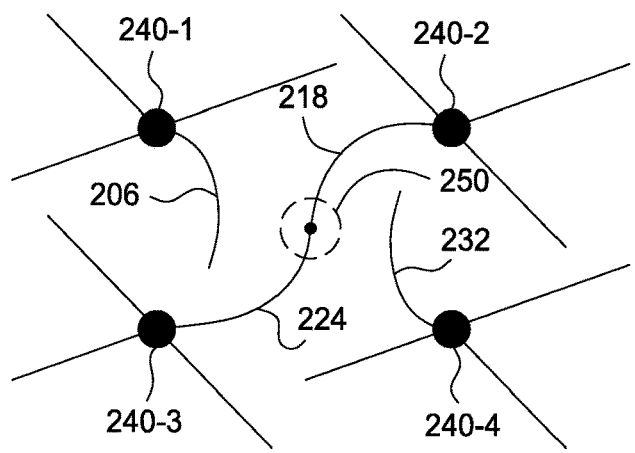
Figure 2C:
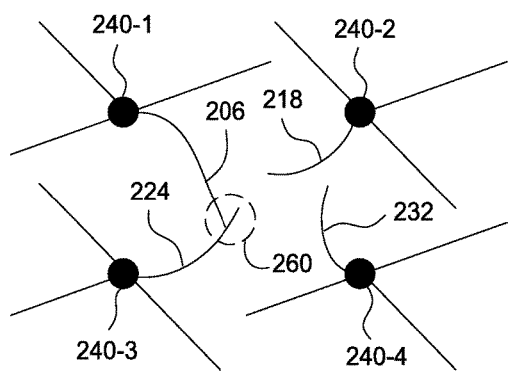

Antenna control unit 130 is configured to provide inputs to the various shape memory alloy elements shown in order to cause those elements to assume specific shapes. For example, antenna control unit 130 could input different amounts of electricity to each different shape memory allow element to cause those elements to bend with differing angles. Alternatively, antenna control unit 130 could input different amounts of heat to each different shape memory allow element to cause those elements to bend by certain degrees. Persons skilled in the art will understand that shape memory alloy elements may assume specific shapes depending on the inputs provided to those elements. Accordingly, antenna control unit 130 may configure each shape memory alloy element to assume a precise shape by providing certain inputs. FIGS. 2B-2C, described below, illustrate exemplary configurations of the shape memory alloy elements included within connector units 200, 210, 220, and 230.

FIG. 2B illustrates connector units 200, 210, 220, and 230 of FIG. 2A configured to form a contact 250, according to one embodiment of the present invention. As shown, shape memory alloy element 218 within connector unit 210 is bent downwards, while shape memory alloy element 224 within connector unit 220 is bent upwards. In this configuration, shape memory alloy elements 218 and 224 form contact 250 with one another. In addition, each of shape memory alloy elements 206 and 232 is bent away from contact 250. The configuration shown in FIG. 2B reflects a portion of a geometry that may be associated with antenna 150. FIG. 2C illustrates another possible geometry portion.

FIG. 2C illustrates connector units 200, 210, 220, and 230 of FIG. 2A configured to form a contact 260, according to one embodiment of the present invention. As shown, shape memory alloy element 206 within connector unit 200 is bent downwards, while shape memory alloy element 224 within connector unit 220 is bent upwards. In this configuration, shape memory alloy elements 206 and 224 form contact 260 with one another. In addition, each of shape memory alloy elements 218 and 232 is bent away from contact 260. The configuration shown reflects another possible portion of a geometry that may be associated with antenna 150.

Referring generally to FIGS. 2B-2C, the shape memory alloy elements within connector units 200, 210, 220, and 230 may assume a wide variety of different shapes, and therefore form multiple different sets of contacts, based on various inputs to those elements. As mentioned, the inputs could include electricity or heat, among others. Antenna 150 may include a planar arrangement of connector units such as those shown in FIGS. 2A-2C, configured to form contacts with one another in the fashion illustrated above. Accordingly, the plane of connector units can be configured to assume an arbitrary planar shape, as shown in FIG. 2D.

Figure 2D:
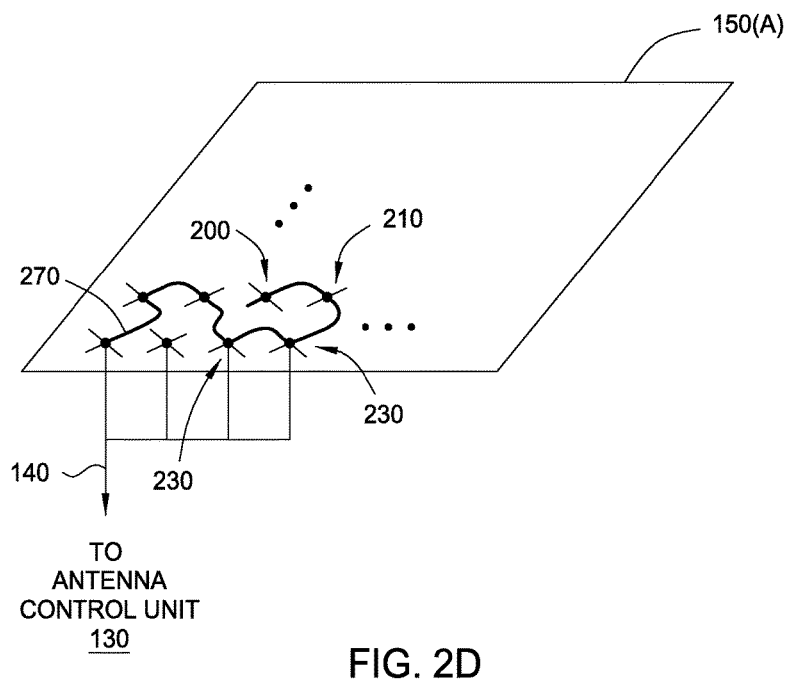

FIG. 2D illustrates an exemplary implementation of antenna 150 of FIG. 1, shown as antenna 150(A), according to one embodiment of the present invention. As shown, antenna 150(A) includes a plurality of connector units, including connector units 200, 210, 220, and 230 of FIGS. 2A-2C, configured to form multiple contacts with one another in order to effect antenna geometry 270. Antenna geometry 270 allows antenna 150(A) to perform RF communications with specific operating characteristics, including a particular frequency range, directionality, transmission power, amplification power, and other such characteristics. Antenna control unit 118 may select a specific operating profile 120 that correspond to these operating characteristics, and then cause antenna control unit 130 to provide inputs to antenna 150(A) that configure the connector units within that antenna to implement antenna geometry 270. The techniques described above in conjunction with FIGS. 2A-2D may also be applied to a 3D version of antenna 150, as described below in conjunction with FIGS. 3A-3B.

Figure 3A:
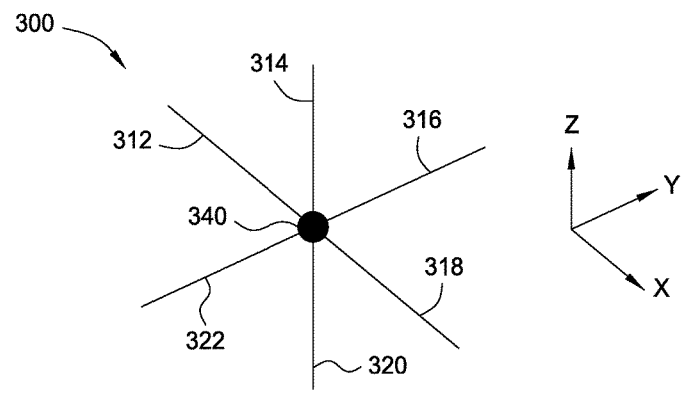
FIGS. 3A-3B illustrate an example of the dynamically configurable antenna of FIG. 1 implemented with memory alloy elements that form a three-dimensional (2D) volume, according to another embodiment of the present invention.

FIG. 3A illustrates a connector unit 300 within antenna 150 of FIG. 1 configured to form a 3D volume, according to one embodiment of the present invention. As shown, connector unit 300 includes shape memory allow elements 312, 314, 316, 318, 320, and 322 coupled to sublink 340 of communication link 140. Sublink 340 is coupled to communication link 140 and allows RF signals to travel to and from communication link 140. Each shape memory alloy element may be a wire, a fin, a filament, or any other element configured to change shape.

Shape memory alloy elements 312 and 318, 314 and 320, and 316 and 322 are oriented in a mutually orthogonal fashion, as is shown. In particular, shape memory alloy elements 312 and 318 are aligned with an X-axis, shape memory alloy elements 314 and 320 are aligned with a Z-axis, and shape memory alloy elements 316 and 322 are aligned with a Y-axis. In this configuration, the various shape memory alloy elements shown extend outwards from sublink 340 to occupy a portion of a 3D volume. Connector unit 300 may form contacts with other connector units (not shown here) residing in 3D space surrounding connector unit 300 in an analogous fashion to connector units 200, 210, 220, and 230 shown in FIGS. 2A-2D. Specifically, antenna control unit 130 may cause shape memory alloy elements 312, 314, 316, 318, 320, and 322 to bend to form contacts with neighboring connector units. With this approach, antenna 150 may assume arbitrary 3D shapes, as shown in FIG. 3B.

Figure 3B:
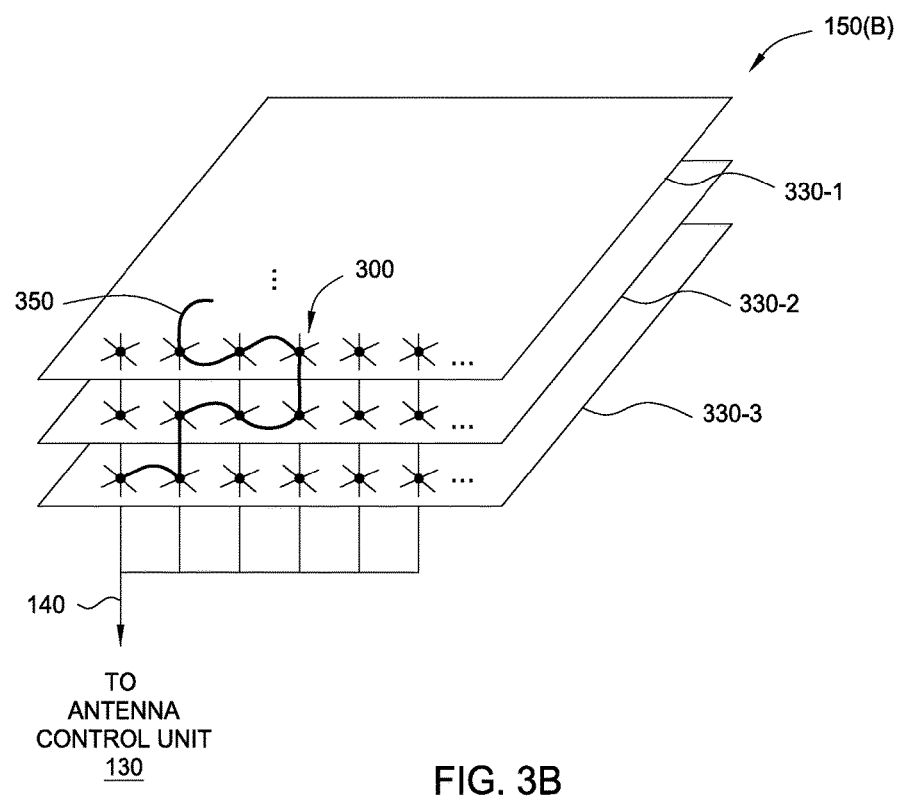

FIG. 3B illustrates another exemplary implementation of antenna 150 of FIG. 1, shown as antenna 150(B), according to one embodiment of the present invention. As shown, antenna 150(B) includes a plurality of connector units, including connector unit 300 of FIG. 3A, configured to form multiple contacts with one another in order to effect antenna geometry 350. Antenna geometry 350 reflects a 3D shape that allows antenna 150(B) to perform RF communications with specific operating characteristics, including a particular frequency range, directionality, transmission power, amplification power, and so forth.

Figure 4A:
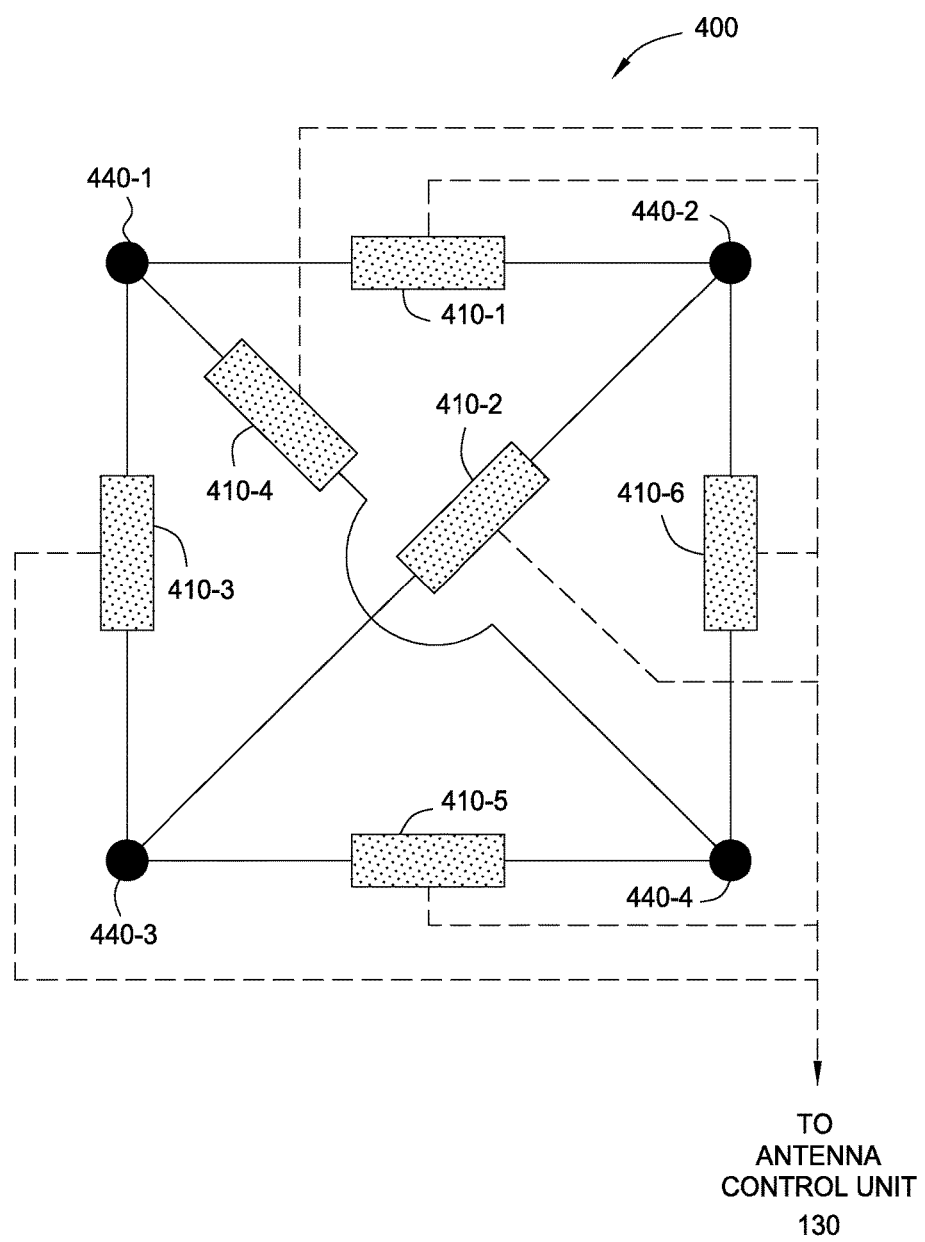
FIGS. 4A-4B illustrate an example of the dynamically configurable antenna of FIG. 1 implemented with a lattice of transistors that form either a 2D plane or 3D volume, according to another embodiment of the present invention.

FIG. 4A illustrates a lattice of transistors configured to form a 2D plane or 3D volume, according to one embodiment of the present invention. As shown, 2D lattice 400 includes transistors 410 coupled between various sublinks 440 and coupled to antenna control unit 130. Specifically, transistor 410-1 is coupled between sublink 440-1 and 440-2, transistor 410-2 is coupled between sublink 440-2 and 440-3, transistor 410-3 is coupled between sublinks 440-1 and 440-3, transistor 410-4 is coupled between sublinks 440-1 and 440-4, transistor 410-5 is coupled between sublinks 440-3 and 440-4, and transistor 410-6 is coupled between sublinks 440-2 and 440-4.

Antenna control unit 130 is configured to selectively switch each of transistors 410 between "on" and "off" states in order to effect different connections between sublinks 440. For example, antenna control unit could switch transistor 410-1 into an "on" state in order to connect sublinks 440-1 and 440-2. With this approach, antenna control unit 130 may form a variety of different sets of connections between sublinks 410 within 2D lattice 400. Antenna 150 may include 2D lattice 400 alone, or in combination with other similar 2D lattices, as shown in FIG. 4B.

Figure 4B:
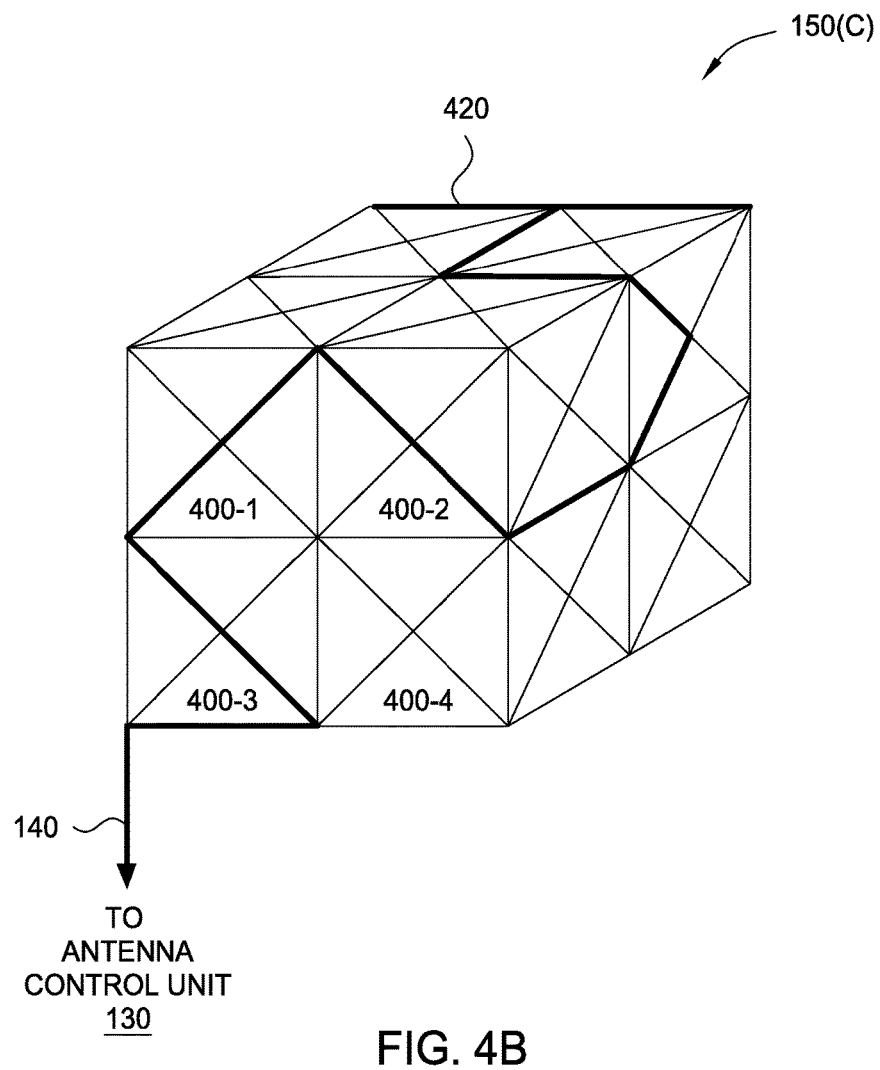

FIG. 4B illustrates another exemplary implementation of antenna 150, shown as antenna 150(C), according to one embodiment of the present invention. As shown, antenna 150(C) includes a 3D lattice composed of 2D lattices 400, including 2D lattice 400-1, 400-2, 400-3, and 400-4, among others. Each of 2D lattices 400-1 through 400-4 includes transistors 410 that may be selectively activated by antenna control unit 130 to effect different connections between sublinks 440, thereby forming antenna geometry 420.

Similar to the other antenna geometries discussed thus far, antenna geometry 420 reflects a 3D shape that allows antenna 150(C) to perform RF communications with specific operating characteristics, including a particular frequency range, directionality, transmission power, amplification power, and so forth.

Figure 5A:
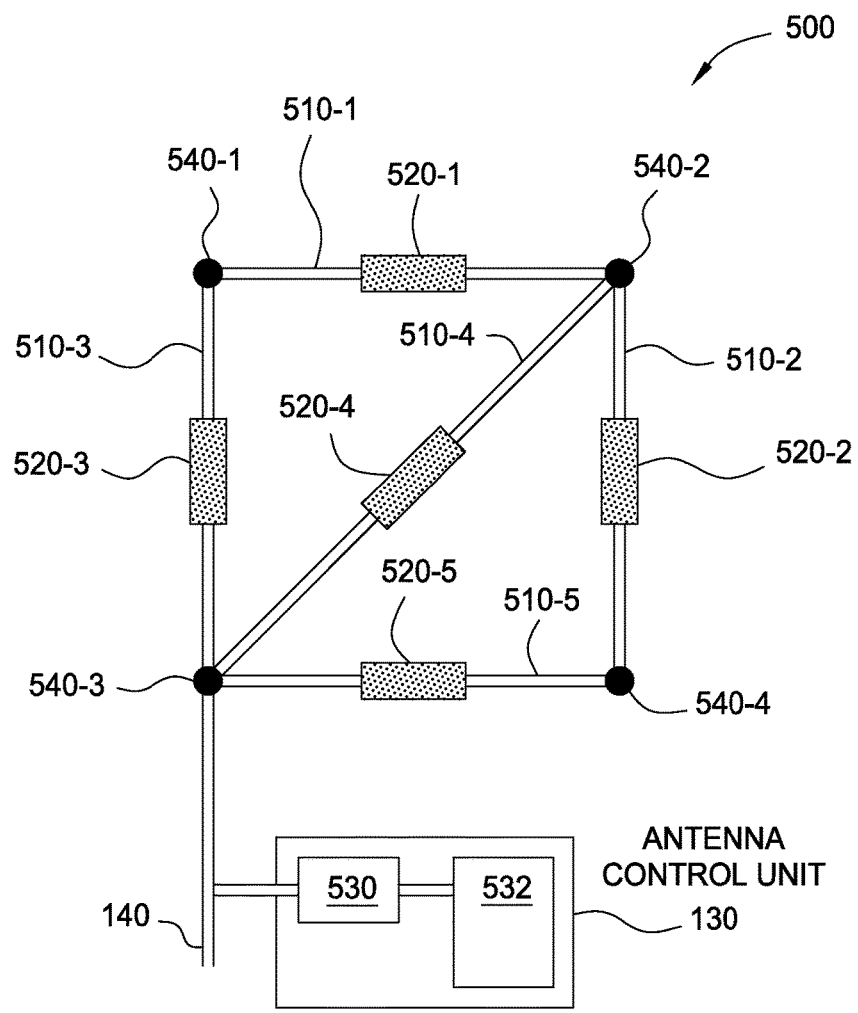
FIGS. 5A-5B illustrate an example of the dynamically configurable antenna of FIG. 1 implemented with a lattice of microfluidic channels that form either a 2D plane or 3D volume, according to another embodiment of the present invention.

FIG. 5A illustrates a lattice of microfluidic channels configured to form a 2D plane or 3D volume, according to one embodiment of the present invention. As shown, 2D lattice 500 includes microfluidic channels 510 configured to couple different sublinks 540 to one another depending on the state of valves 520. Specifically, microfluidic channel 510-1 is configured to couple sublink 540-1 to sublink 540-2 depending on the state of valve 520-1, microfluidic channel 510-2 is configured to couple sublink 540-2 to sublink 540-4 depending on the state of valve 520-2, microfluidic channel 510-3 is configured to couple sublink 540-1 to sublink 540-3 depending on the state of valve 520-3, microfluidic channel 510-4 is configured to couple sublink 540-2 to sublink 540-3 depending on the state of valve 520-4, and microfluidic channel 510-5 is configured to couple sublink 540-3 to sublink 540-4 depending on the state of valve 520-5.

Microfluidic channels 510 are configured to transport a conductive fluid that may form connections between sublinks 540 when specific valves 520 are open. For example, when valve 520-1 is open, microfluidic channel 510-1 may transport the conductive fluid between sublinks 540-1 and 540-2, thereby forming an electrical connection between those sublinks. Generally, the electrical connections formed allow the transport of RF signals.

2D lattice 500 is coupled to a pump 530 and reservoir 532 within antenna control unit 130. Reservoir 532 stores the conductive fluid, while pump 530 pressurizes that fluid for delivery to 2D lattice 500. Accordingly, when specific valves 520 are opened, the pressurized conductive fluid may flow through the open valves and provide electrical connections between certain sublinks 540. Antenna 150 may include 2D lattice 500 alone, or in combination with other similar 2D lattices, as shown in FIG. 5B.

Figure 5B:
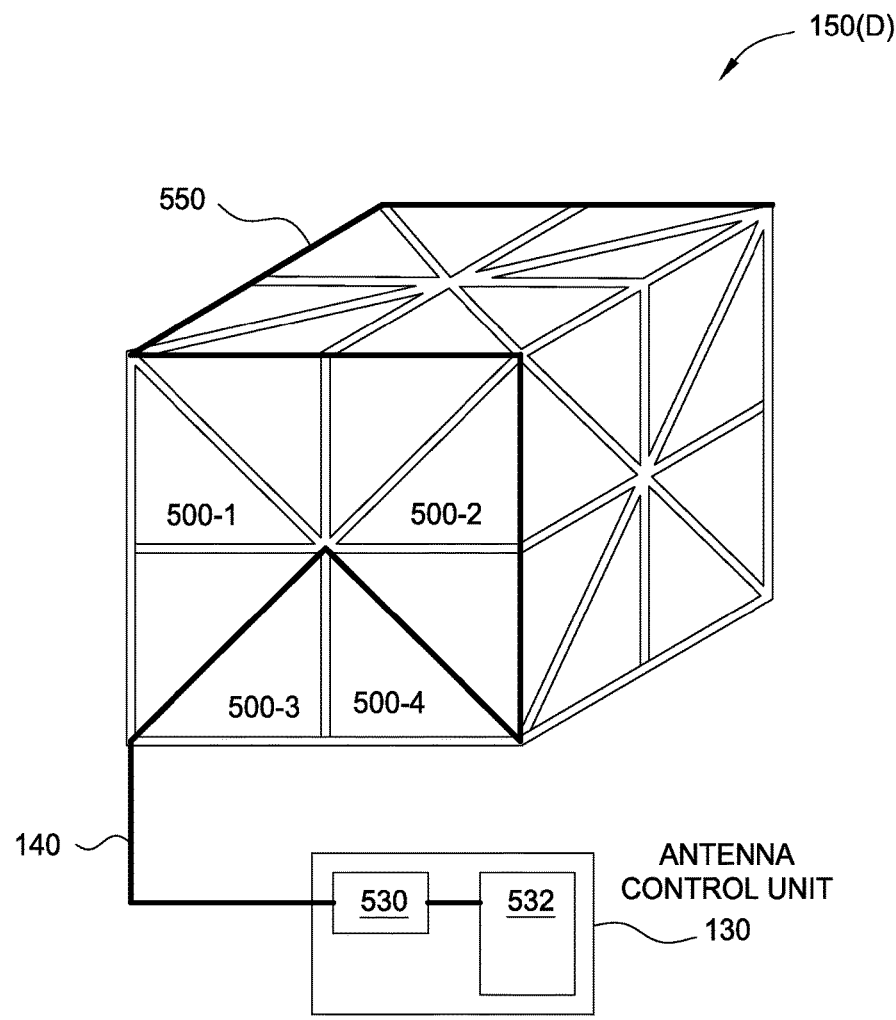

FIG. 5B illustrates another exemplary implementation of antenna 150, shown as antenna 150(D), according to one embodiment of the present invention. As shown, antenna 150(D) includes a 3D lattice composed of 2D lattices 500 including 2D lattice 500-1, 500-2, 500-3, and 500-4, among others. Each of 2D lattices 500-1 through 500-4 includes microfluidic channels 510 and associated valves 520 that may be selectively opened and closed by antenna control unit 130 to effect different fluid connections between sublinks 540, thereby forming antenna geometry 550.

Similar to the other antenna geometries discussed thus far, antenna geometry 550 reflects a 3D shape that allows antenna 150(D) to perform RF communications with specific operating characteristics, including a particular frequency range, directionality, transmission power, amplification power, and so forth.

Figure 6:
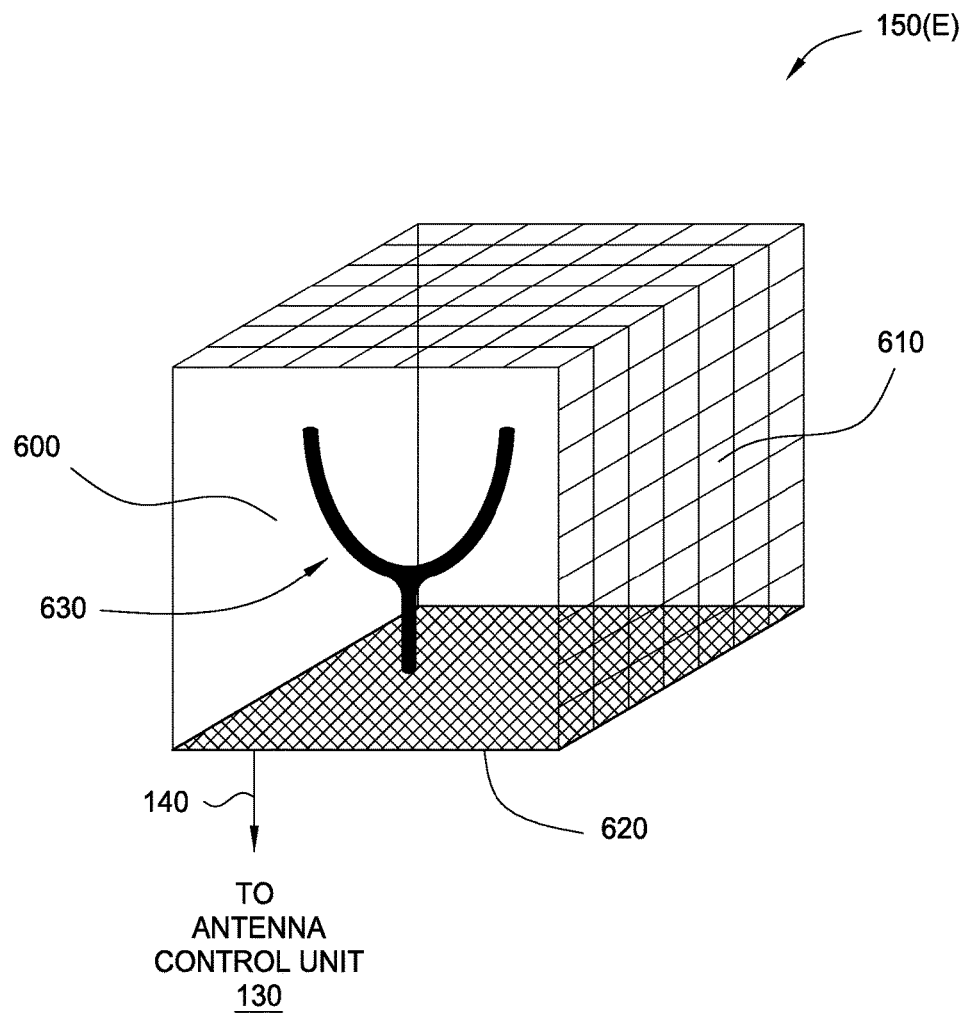
FIG. 6 illustrates an example of the dynamically configurable antenna of FIG. 1 implemented with a magnetorheological fluid chamber that includes suspended ferromagnetic particles that form arbitrary configurations, according to other embodiments of the present invention.

FIG. 6 illustrates another exemplary implementation of antenna 150, shown as antenna 150(E), implemented with a magnetorheological fluid chamber that includes suspended ferromagnetic particles that form arbitrary configurations, according to other embodiments of the present invention. As shown, magnetorheological fluid chamber 600 resides within an electromagnetic Halbach array 610 situated atop a conductor plate 620. Magnetorheological fluid chamber 600 includes a suspension of ferromagnetic particles that may be controlled via electromagnetic Halbach array 610. Specifically, antenna control unit 130 is configured to issue control signals to electromagnetic Halbach array 610 in order to cause those suspended particles to assume arbitrary shapes, such as antenna geometry 630. Antenna geometry 630 is a conductive assembly of ferromagnetic particles coupled to communication link 140 via conductive plate 620. Antenna geometry 630 may couple various portions of conductive plate 620 and/or communication link 140 to one another to achieve various antenna geometries.

Similar to the other antenna geometries discussed thus far, antenna geometry 630 reflects a 3D shape that allows antenna 150(E) to perform RF communications with specific operating characteristics, including a particular frequency range, directionality, transmission power, amplification power, and so forth.

Referring generally to FIGS. 2A-6, antenna 150 may be implemented by according to any of the embodiments discussed thus far. Regardless of the specific antenna implementation used, antenna control unit 118 may select a specific operating profile 120 for antenna 150, and then cause antenna control unit 130 to provide inputs to antenna 150 to effect a specific geometry. This general approach is described in stepwise fashion below in conjunction with FIG. 7.

Technique for Configuring a Dynamically Configurable Antenna

Figure 7:
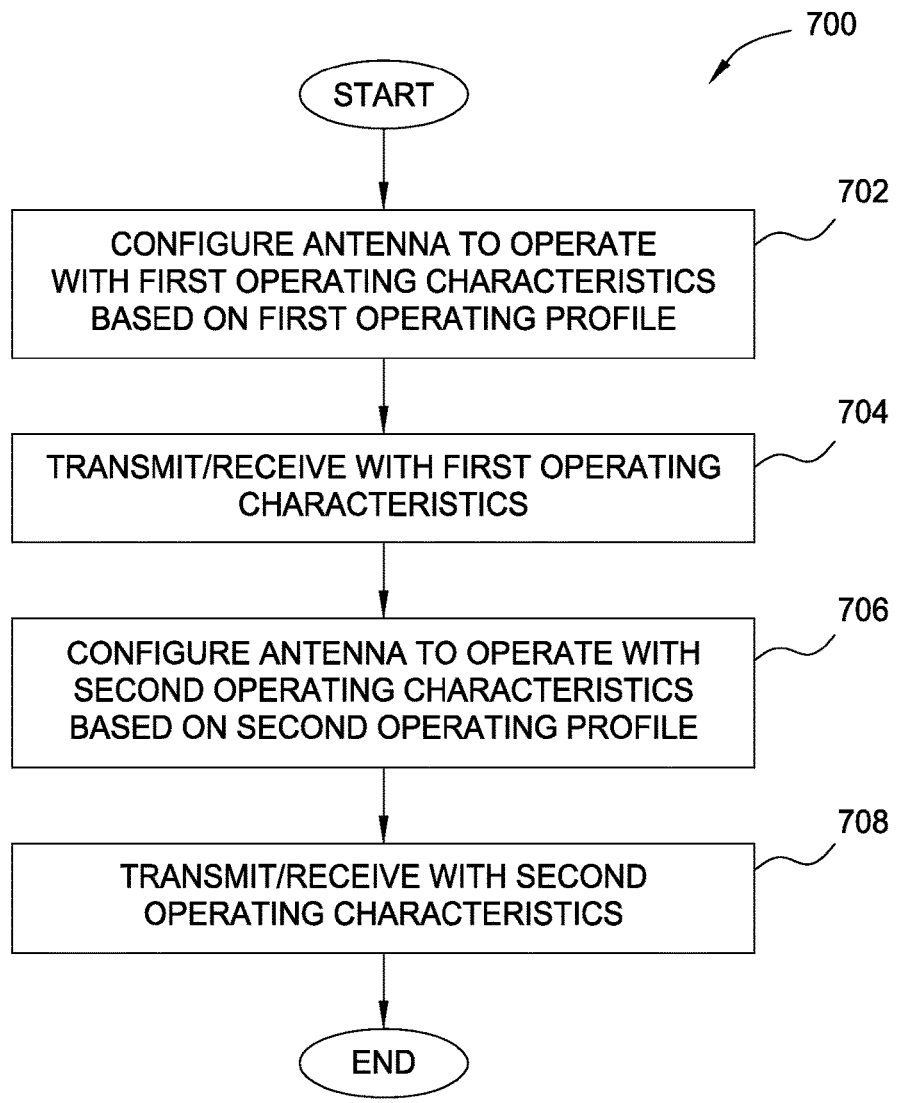
FIG. 7 is a flow diagram of method steps for modifying the operating characteristics of a dynamically configurable antenna, according to one embodiment of the present invention.

FIG. 7 is a flow diagram of method steps for modifying the operating characteristics of a dynamically configurable antenna, according to one embodiment of the present invention. Although the method steps are described in conjunction with the systems of FIGS. 1-6, persons skilled in the art will understand that any system configured to perform the method steps, in any order, is within the scope of the present invention.

As shown, a method 700 begins at step 702, where antenna control application 118 configures antenna 150 to operate with first operating characteristics based on a first operating profile 120. In doing so, antenna control application 118 may select the first operating profile based on a current use-case associated with system 100 of FIG. 1, and then transmit that profile to antenna control unit 130. Antenna control unit 130 may then provide various inputs to antenna 150 to alter the physical structure of antenna 150 to operate according to the first operating characteristics. The current use-case may indicate a current set of communication needs or parameters including, for example, a minimum transmission or reception power, minimum signal-to-noise ratio, and so forth.

At step 704, antenna control application 118 causes antenna 150 to transmit and/or receive data according to the first set of operating characteristics. The first set of operating characteristics could include, for example, a specific frequency range, a specific transmission or amplification power, a given target signal-to-noise ratio, an optimal directionality, and so forth.

At step 706, antenna control application 118 configures antenna 150 to operate with second operating characteristics based on a second operating profile 120. In doing so, antenna control application 118 may select the second operating profile based on an updated use-case associated with system 100 of FIG. 1, and then transmit that profile to antenna control unit 130. For example, system 100 could migrate from a geographic region where the first operating characteristics are desirable to a second geographic region where the second operating characteristics are desirable. Upon detecting this change, antenna control application 118 would reconfigure antenna 150 according to the second operating profile. Antenna control unit 130 would then provide various inputs to antenna 150 to alter the physical structure of antenna 150 to operate according to the second operating characteristics. The updated use-case may indicate an updated set of communication needs or parameters including, for example, a minimum transmission or reception power, minimum signal-to-noise ratio, and so forth.

At step 706, antenna control application 118 causes antenna 150 to transmit and/or receive data according to the second set of operating characteristics. The second set of operating characteristics could include, for example, a different specific frequency range, another specific transmission or amplification power, a new target signal-to-noise ratio, an updated directionality, and so forth.

Persons skilled on the art will recognize that antenna control application 118 operates in conjunction with antenna control unit 130 and any of the exemplary implementations of antenna 150 discussed thus far in performing the method 700. Furthermore, antenna control application 118 is configured to perform some or all of the method steps described above repeatedly, as needed, depending on the communication needs associated with system 100.

In sum, a dynamically configurable antenna is integrated into a system configured to transmit and receive data. Antenna control software and/or hardware configures the antenna to transmit and receive data with different operating characteristics, depending on the communication needs of the system. The physical structure of the dynamically configurable antenna can be modified in order to perform data communications with specific frequency ranges, directionalities, transmission and/or amplification powers, and other operating characteristics generally associated with wireless RF communication.

At least one advantage of the techniques set forth herein is that the dynamically configurable antenna is applicable to a wider range of use cases compared to conventional antennas. Since the dynamically configurable antenna can be physically modified to assume different antenna geometries, the disclosed antenna may achieve a broader range of design objectives while reducing the number of design tradeoffs needed to accomplish those objectives.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. An antenna configured for a range of antenna geometries, the antenna comprising:
   a first communication link configured to transport data signals; and
   a first antenna element coupled to the first communication link and configured to:
      receive a first control signal,
      in response to the first control signal, alter a structural characteristic of at least a first portion of the first antenna element to cause a first connection to be formed between the first portion of the first antenna element and a second antenna element,
      receive a second control signal, and
      in response to the second control signal, alter the structural characteristic of at least the first portion of the first antenna element to cause a different connection to be formed between the first portion of the first antenna element and a third antenna element, wherein the third antenna element is different than the second antenna element.

2. The antenna of claim 1, wherein the first antenna element comprises a shape memory alloy element that, in response to the first control signal, bends to cause the first connection to be formed between the first antenna element and the second antenna element.

3. The antenna of claim 2, wherein the first control signal comprises a first electric voltage, a first electric current, or a first amount of heat.

4. The antenna of claim 1, wherein the first antenna element comprises a logic element that, in response to the first control signal, switches to an "on" state to alter the structural characteristic to electrically couple the first antenna element to the second antenna element to cause the first connection to be formed.

5. The antenna of claim 1, wherein the first antenna element comprises a valve in a microfluidic channel, wherein the microfluidic channel is configured to carry an electrically conductive fluid, and the valve is configured to open, in response to the first control signal, to permit the electrically conductive fluid to electrically couple the first antenna element to the second antenna element to cause the first connection to be formed.

6. The antenna of claim 1, wherein the first antenna element comprises a ferromagnetic particle suspended within a magnetorheological fluid chamber, and wherein the first control signal causes the suspension of ferromagnetic particles to electrically couple the first antenna element to the second antenna element to cause the first connection to be formed.

7. The antenna of claim 6, wherein the magnetorheological fluid chamber resides within an electromagnetic Halbach array that is configured to output the first control signal.

8. The antenna of claim 1, wherein a first antenna geometry is associated with a first set of operating characteristics that includes at least one of a first antenna transmission frequency spectrum, a first antenna reception frequency spectrum, a first antenna directionality, a first antenna transmission power, and a first antenna amplification power.

9. The antenna of claim 1, wherein the first antenna element is further configured to:
in response to the second control signal, form the different connection between the first antenna element and the third antenna element to effect a first antenna geometry.

10. The antenna of claim 9, wherein the first antenna geometry is associated with a first set of operating characteristics that includes at least one of a first antenna transmission frequency spectrum, a first antenna reception frequency spectrum, a first antenna directionality, a first antenna transmission power, and a first antenna amplification power.

11. A computer-implemented method for transmitting data, the method comprising:
configuring an antenna to operate with a first set of operating characteristics based on a first operating profile by altering a shape of at least a first portion of a first antenna element to cause a first connection to be formed between the first portion of the first antenna element and a second antenna element;
causing the antenna to transmit or receive a first data signal according to the first set of operating characteristics;
configuring the antenna to operate with a second set of operating characteristics based on a second operating profile by altering the shape of at least the first portion of the first antenna element to cause a different connection to be formed between the first portion of the first antenna element and a third antenna element, wherein the third antenna element is different than the second antenna element; and
causing the antenna to transmit or receive a second data signal according to the second set of operating characteristics.

12. The computer-implemented method of claim 11, wherein configuring the antenna to operate with the first set of operating characteristics comprises causing the antenna to effect a first antenna geometry reflected by the first operating profile, and wherein configuring the antenna to operate with the second set operating characteristics comprises causing the antenna to effect a second antenna geometry reflected by the second operating profile.

13. The computer-implemented method of claim 12, wherein the first antenna geometry is associated with a first set of operating characteristics that includes at least one of a first antenna transmission or reception frequency spectrum, a first antenna directionality, and a first antenna transmission or reception power, and wherein the second antenna geometry is associated with a second set of operating characteristics that includes at least one of a second antenna transmission or reception frequency spectrum, a second antenna directionality, and a second antenna transmission or reception power.

14. The computer-implemented method of claim 11, further comprising:
selecting the first operating profile based on a current set of communication parameters associated with the antenna; and
selecting the second operating profile based on an updated set of communication parameters associated with the antenna.

15. The computer-implemented method of claim 14, wherein the current set of communication parameters and the updated set of communication parameters includes at least one of a minimum transmission or reception power and a minimum signal-to-noise ratio.

16. A non-transitory computer-readable medium storing program instructions that, when executed by a processor, cause the processor to transmit data, by performing the steps of:
configuring an antenna to operate with a first set of operating characteristics based on a first operating profile by rearranging a plurality of antenna elements to cause a first connection to be formed between a first portion of a first antenna element and a second antenna element;
causing the antenna to transmit or receive a first data signal according to the first set of operating characteristics;
configuring the antenna to operate with a second set of operating characteristics based on a second operating profile by rearranging the plurality of antenna elements to cause a different connection to be formed between the first portion of the first antenna element and a third antenna element, wherein the third antenna element is different than the second antenna element; and
causing the antenna to transmit or receive a second data signal according to the second set of operating characteristics.

17. The non-transitory computer-readable medium of claim 16, wherein the step of configuring the antenna to operate with the first set of operating characteristics comprises causing the antenna to effect a first antenna geometry reflected by the first operating profile, and wherein the step of configuring the antenna to operate with the second set operating characteristics comprises causing the antenna to effect a second antenna geometry reflected by the second operating profile.

18. The non-transitory computer-readable medium of claim 17, wherein the first antenna geometry is associated with a first set of operating characteristics that includes at least one of a first antenna transmission or reception frequency spectrum, a first antenna directionality, and a first antenna transmission or reception power, and wherein the second antenna geometry is associated with a second set of operating characteristics that includes at least one of a second antenna transmission or reception frequency spectrum, a second antenna directionality, and a second antenna transmission or reception power.

19. The non-transitory computer-readable medium of claim 16, further comprising the steps of:

selecting the first operating profile based on a current set of communication parameters associated with the antenna; and selecting the second operating profile based on an updated set of communication parameters associated with the antenna.

20. The non-transitory computer-readable medium of 19, wherein the current set of communication parameters and the updated set of communication parameters includes at least one of a minimum transmission or reception power and a minimum signal-to-noise ratio.

21. The non-transitory computer-readable medium of claim 16, wherein rearranging the plurality of antenna elements comprises rearranging positions of one or more antenna elements included in the plurality of antenna elements.

22. An antenna configured for a range of antenna geometries, the antenna comprising:
a first communication link configured to transport data signals; and
a first antenna element coupled to the first communication link and configured to:
receive a first control signal, and
in response to the first control signal, form a first connection between a first portion of the communication link and a second portion of the communication link to effect a first antenna geometry,
wherein the first antenna element comprises a valve in a microfluidic channel, wherein the microfluidic channel is configured to carry an electrically conductive fluid, and the valve is configured to open, in response to the first control signal, to permit the electrically conductive fluid to electrically couple the first portion of the communication link to the second portion of the communication link to form the first connection.

23. An antenna configured for a range of antenna geometries, the antenna comprising:
a first communication link configured to transport data signals; and
a first antenna element coupled to the first communication link and configured to:
receive a first control signal, and
in response to the first control signal, form a first connection between a first portion of the communication link and a second portion of the communication link to effect a first antenna geometry,
wherein the first antenna element comprises a ferromagnetic particle suspended within a magnetorheological fluid chamber, and wherein the first control signal causes the suspension of ferromagnetic particles to electrically couple the first portion of the communication link to the second portion of the communication link to form the first connection.

24. The antenna of claim 23, wherein the magnetorheological fluid chamber resides within an electromagnetic Halbach array that is configured to output the first control signal.

25. The antenna of claim 1, wherein the first control signal comprises a first amount of electric voltage, a first amount of electric current, or a first amount of heat, and the first control signal causes the first portion of the first antenna element to be altered by a first angle that is based on the first amount of electric voltage, the first amount of electric current, or the first amount of heat.

* * * * *